United States Patent
Yamasaki et al.

(10) Patent No.: US 9,200,509 B2
(45) Date of Patent: Dec. 1, 2015

(54) SYSTEM AND METHOD FOR MEASURING WELL FLOW RATE

(71) Applicant: Chevron USA Inc., Houston, TX (US)

(72) Inventors: Mark Hiroshi Yamasaki, Houston, TX (US); David King Anderson, II, The Woodlands, TX (US); Richard Paul Rubbo, The Woodlands, TX (US); Mitcell Carl Smithson, Pasadena, TX (US)

(73) Assignee: Chevron USA Inc., San Ramon, CA (US)

( * ) Notice: Subject to any disclaimer, the term of this patent is extended or adjusted under 35 U.S.C. 154(b) by 318 days.

(21) Appl. No.: 13/773,512

(22) Filed: Feb. 21, 2013

(65) Prior Publication Data

US 2013/0327520 A1 Dec. 12, 2013

Related U.S. Application Data (60) Provisional application No. 61/601,150, filed on Feb. 21, 2012.

(51) Int. Cl.

| | | |
|---|---|---|
| *E21B 47/08* | (2012.01) | |
| *E21B 47/00* | (2012.01) | |
| *G01P 3/28* | (2006.01) | |
| *E21B 47/04* | (2012.01) | |

(52) U.S. Cl.
CPC ........... *E21B 47/0008* (2013.01); *E21B 47/042* (2013.01); *G01P 3/28* (2013.01)

(58) Field of Classification Search
CPC  E21B 47/0003; E21B 47/0007; E21B 47/042
See application file for complete search history.

(56) References Cited

U.S. PATENT DOCUMENTS

| | | | | |
|---|---|---|---|---|
| 5,823,262 | A * | 10/1998 | Dutton | 166/250.15 |
| 7,212,923 | B2 | 5/2007 | Gibbs et al. | |
| 8,844,626 | B1 * | 9/2014 | Krug | 166/250.08 |
| 2004/0064292 | A1 | 4/2004 | Beck et al. | |
| 2005/0217350 | A1 | 10/2005 | Jabusch et al. | |
| 2011/0098931 | A1 | 4/2011 | Kosmala et al. | |

FOREIGN PATENT DOCUMENTS

| | | |
|---|---|---|
| KR | 10-2009-0120826 A | 11/2009 |
| WO | 2011/044023 A2 | 4/2011 |

OTHER PUBLICATIONS

Echometer Company; Echometer TechNote: Pump Card Shape; 2000; Wichita Falls, Texas, USA.
Lufkin Automation; Lufkin Well Manager Rod Pump Control User Manual; App. B (pp. B-1-14) and App. E (pp. E-1-11); Manual pp. 1-19, 443-456, 499-509; Mar. 1, 2011; Missouri City, Texas, USA.

* cited by examiner

*Primary Examiner* — William P Neuder
(74) *Attorney, Agent, or Firm* — King & Spalding LLP (57) ABSTRACT

The present invention discloses an improved system for measurement of the liquid flow rate and totalized liquid production of a producing well. In the method of the present invention, liquid production rate in a pumping well is determined by calculation based upon wellbore geometry and continuously monitoring the depth of the fluid level within the wellbore. It is applicable to any pump lifted well where it is possible to shut the pump off periodically. Accuracy is enhanced with this method by properly accounting for pump leakage and where pump leakage is either known or can be estimated within reasonable limits or where it is measured during the pump shut off cycle.

13 Claims, 4 Drawing Sheets

SYSTEM AND METHOD FOR MEASURING WELL FLOW RATE

TECHNICAL FIELD OF INVENTION

The present invention relates to a new system and method for measuring fluid flow in liquid producing subterranean wells. The present invention further relates to a system and method that can be applied to existing producing wells without the need to add surface or subsurface flow metering devices, and without the need to connect divertible flow to a central monitoring station. In particular, the present invention provides a system (and alternatives) for electronically assessing the changing height of a liquid level in a well with time, under opposing conditions of pump operation and pump shut-in. Functions developed for cross-sectional area of the well with depth and liquid level with time under the opposing pumping conditions are resolved for a determination of pump flow rate. The results can be used to provide real-time indications of changes in pump condition or operations, as well as long-term changes in reservoir properties.

BACKGROUND OF THE INVENTION

In the production of oil, it is highly desirable to be able to continuously measure the production rate from an individual well, and to measure its total production over defined periods of time. Several problems and limitations of known methods of making these measurements are present. For example, one known problem with rod pump systems is that the traveling valve and standing valve may leak after a short time in service. As a result, a measured build-up of fluid cannot solely be attributed to reservoir inflow, but will also include fluid contributed by the valve leaks. This and other problems contribute to the complexity of the task. Using conventional technology, well flow rate is determined in a number of ways.

A first known method of measuring well flow rate is by use of a dedicated surface meter. Although this method is generally recognized to be the most accurate means for measuring flow rate, the high cost of such dedicated metering equipment has prevented its use on all but a small fraction of the most important producing wells. For custody transfer applications where high accuracy is important, the expense of such dedicated metering may be justified, but in most instances, the high cost of the equipment prohibits their selection and use.

A second known method of measuring well flow rate is by use of a dedicated downhole meter inside the well. This method is often even more expensive than the use of surface mounted equipment because of the high cost of the downhole compatible packaging and of providing connectivity to the downhole meter. This method further suffers from a lack of reliability and difficulty in accessing and servicing downhole equipment.

A third known method of measuring well flow rate is by correlating to pump performance curves for rotating pumps such as progressive cavity pumps or electronic submersible pumps. Load measuring surface equipment is required for measuring the varying loads on the pumping equipment. This method has been shown to often yield inaccurate results as the pump's performance degrades over time and can vary significantly from unit to unit and over time as a result of changes in fluid properties and other dynamic operating conditions. Consequently, this approach is not considered broadly reliable or effective in practice.

A fourth known method of measuring well flow rate is by correlating dimensions and the speed of the pump to develop pump displacement rates with a correction factor. The correction factor is based on several assumptions, each of which is subject to change over time and error for multiple reasons. This method is applicable to rod or beam pumping well applications, and although it does not require additional hardware, it has been shown to give inaccurate results as the pump performance varies due to rod stretch, friction, fluid compressibility, and pump wear over time, which rates vary from well to well. Additional error may be caused by the presence of internal standing or traveling valve leakage and further due to changes in the rate of valve leakage, and which vary from well to well over time.

A related method is disclosed in U.S. Pat. No. 7,212,923, to Gibbs et al. In this disclosure, a well manager is used in combination with a rod-pumping unit to infer liquid production and gas production of a well. The practice of this invention relies on surface load and position measurements of the rod-pumping unit.

A fifth known method of measuring well flow rate is used for managing field production in high well density fields, where wells are in relatively close proximity. In this method, a dedicated surface metering system is put in place to service multiple wells. Surface piping is set up to periodically vent each well's production for a certain time to pass through the flow meter. The periodic routing of the wells can be automated through the use of remote control valves. While the per well expense of such a system is lower than having a dedicated meter for each well, this system suffers the disadvantage in the time required for the flow to fill the feed line and stabilize to allow an accurate reading of the measured well. Another disadvantage is that the readings for any well are only done periodically. Typically, a test is performed in such a system only once every three weeks, and the test will only be allowed to last for a few hours. Another disadvantage of this system is that actual individual well flow rates have been shown to vary substantially over much shorter periods than the period between such tests due to a myriad of factors.

Thus, there remains a need in the management of field production wells for a method of measuring cumulative production over time with reasonable accuracy in the ranges of up to +/−5% or up to +/−10% within each 24 hour period in a cost effective manner. As described, none of the conventional methods consistently satisfy this requirement. The present invention overcomes the several economic and engineering challenges to fill this need, by providing a unique system and method for the measurement of the flow rate of a producing well.

SUMMARY OF THE INVENTION

The present invention provides a substantially improved system for measurement of the flow rate and totalized production of a producing well. In the method of the present invention, liquid production rate in a pumping well is determined by monitoring the depth of the fluid level within the wellbore. It is applicable to any pump lifted well where it is possible to shut the pump off periodically. Accuracy is enhanced with this method by properly accounting for pump leakage and where pump leakage is either known or can be estimated within reasonable limits or where it is measured during the shut in cycle.

Where appropriate, the invention described below is expressed using English units for the sake of example only. It will be understood by a person of ordinary skill that the use of the English Measurement System is by no means a limitation of the invention, but rather that the invention may be used with any standardized measurement system, including the metric system.

In one embodiment, a measuring device, such as an electronic or sonic signaling device or other mechanism is provided for measuring the depth of the top of the liquid column in the annulus of the well. The known wellbore geometry is relied on to determine the annular area of at least the fluid-containing portion of the wellbore as a function of depth. The measuring device is used to measure the fluid level in the annulus over time while the pump is not operating.

The annular build-up flow rate is then calculated as a function of the annular area and the measured change in height of the fluid level while the pump is not operating. A pump leak rate is determined as greater than or equal to zero. This may be determined by measurement, historical value, or other estimate. A reservoir flow rate is calculated as the difference between the annular build-up flow rate and pump leak rate.

Measurements of the fluid level in the annulus over time are also made while the pump is operating. An annular drawn-down flow rate is calculated as a function of annular area and the measured change in height of the fluid level while the pump is operating. A pump rate is then calculated as the sum of the annular drawn-down flow rate and the reservoir flow rate.

In another embodiment, while the pump is running, continuous or intermittent measurements of the depth of the fluid level in the annulus over time are made to compare to the calculated annular drawn-down flow rate. In this embodiment, a first average of measurements over a first discrete period of time is calculated. A first average drawn-down flow rate is calculated for the first period. A second average of measurements over a second discrete period of time is calculated. A second average drawn-down flow rate is calculated for the second period. The first and second average drawn-down rates are compared. In another embodiment, an alarm range is set for the difference between the first and second average drawn-down rates, such that an alarm can be electronically and otherwise telecommunicated to the operator when an unexpected change of an unaccepted magnitude occurs in the drawn-down rate.

As will be understood by one of ordinary skill in the art, the sequence of the steps disclosed may be modified and the same advantageous result obtained. In particular, it will be obvious to one of ordinary skill in the art that certain steps need not be performed in the sequence described.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
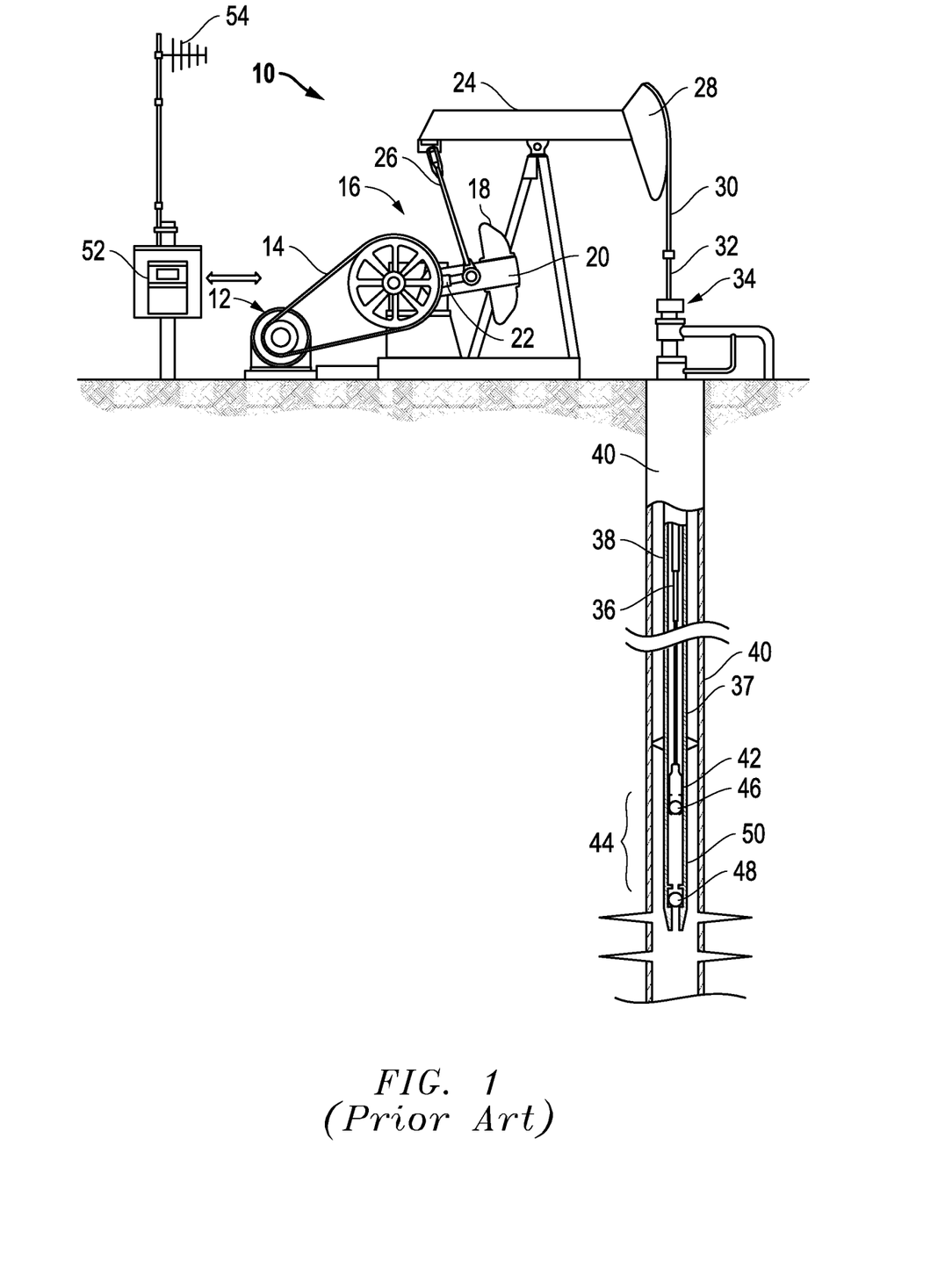
FIG. 1 is a diagrammatic representation of a conventional pumping unit as known in the prior art for which the present invention may be applied.

The present invention uses a typical rod pumping system, as shown as FIG. 1, generally indicated by reference number 10, including a prime mover 12, typically an electric motor. The power output from the prime mover 12 is transmitted by a belt 14 to a gear box unit 16. The gear box unit 16 reduces the rotational speed generated by prime mover 12 and imparts a rotary motion to a pumping unit counterbalance, a counterweight 18, and to a crank arm 20 which is journaled to a crank shaft end 22 of gear box unit 16. The rotary motion of crank arm 20 is converted to reciprocating motion by means of a walking beam 24. Crank arm 20 is connected to walking beam 24 by means of a Pitman 26. A walking horsehead 28 and a cable 30 hang a polished rod 32 which extends through a stuffing box 34.

A rod string 36 of sucker rods is connected to polished rod 32 within a tubing 38 located in a casing 40. In some embodiments, tubing 38 can be electrically insulated from casing 40 by multiple plastic centralizers 37. The rod string 36 is connected to a plunger 42 of a subsurface pump 44. Pump 44 includes a traveling valve 46, a standing valve 48 and a pump barrel 50. In a reciprocation cycle of the structure, including the walking beam 24, polished rod 32, rod string 36 and pump plunger 42, fluids are lifted on the upstroke. When pump fillage occurs on the upstroke between the traveling valve 46 and the standing valve 48, the fluid is trapped above the standing valve 48. A portion of this fluid is displaced above the traveling valve 46 when the traveling valve moves down. Then, this fluid is lifted toward the surface on the upstroke.

The pumping unit 10 is controlled by a microprocessor based pump off controller 52. Typically, the operating status is communicated to centralized SCADA systems via radios 54 or other communication systems. In some embodiments of the present invention, the hardware for determining depth and calculating the flow rate or volume is co-located with or integrated with the pump off controller 52.

Figure 2A:
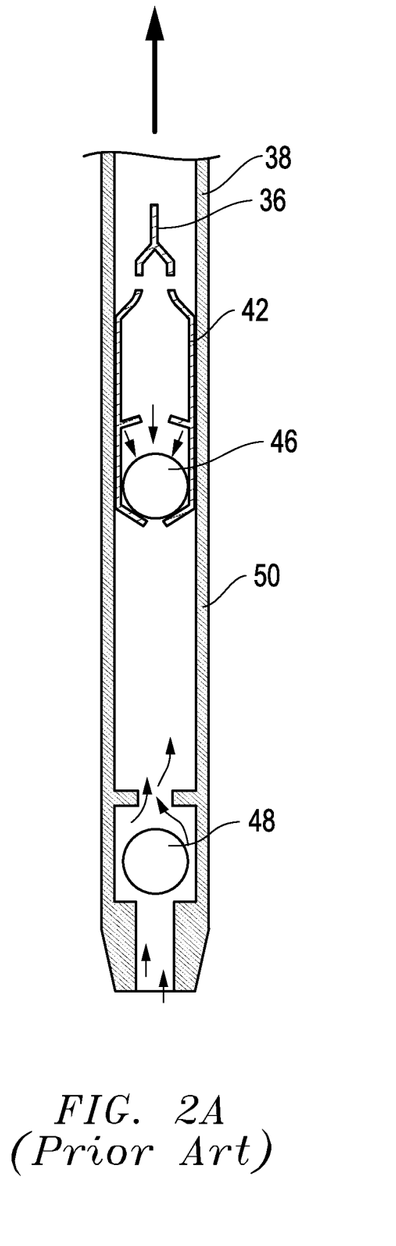
FIGS. 2A and 2B are diagrammatic representations of a conventional downhole pump, illustrating the pumping unit on the upstroke and downstroke, respectively.
Figure 2B:
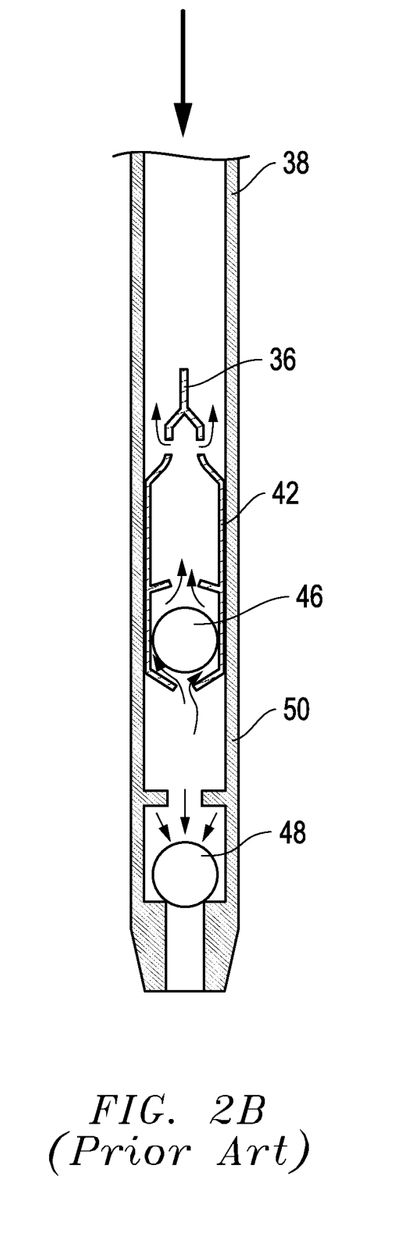

A schematic description of the operation of the subsurface pump 44 is illustrated in FIGS. 2A and 2B. As shown in FIG. 2A, when the rod string 36 is in an upstroke, the traveling valve 46 is closed and the fluid is lifted upward in the tubing 38. Simultaneously, during the upstroke, fluid is drawn upward into the pump barrel 50 through the open standing valve 48. Referring to FIG. 2B, the downstroke of the pump 44 is shown. As the plunger 42 is lowered, the traveling valve 46 is opened due to the directional change in fluid flow, thereby permitting fluid within the pump barrel 50 to pass through the valve 46 to allow the plunger 42 to move downward. The fluid within the tubing 38 and the barrel 50 is held fixed in place by the closed standing valve 48. The rod string 36 does not carry any weight of fluid during the down stroke, but does lift the entire column of fluid during the upstroke. Thus, as the pumping system 10 reciprocally alternates between upstrokes and downstrokes, fluid is continuously drawn upward to the surface of the well.

As seen in FIG. 1, the annular area is defined by the inside diameter of the casing 40 and generally the outside diameter of the tubing 38. However, the outside diameter of the pump 44 is likely different than the tubing 38. A wellbore may have other diameter changes, such as a liner construction. Describing the wellbore geometry as a function of depth accommodates the variation in annular area.

A fundamental problem with rod pump systems is that the traveling valve 46 and standing valve 48 may leak after a short time in service. As a result, a measured buildup in fluid cannot solely be attributed to reservoir inflow, but will also include a volume of fluid contributed by the leaking in these valves.

Fluid Level Measurement

Continuous wellbore fluid level may be monitored by any one of the known methods, or in accordance with the system disclosed in this application. Examples of the known methods for monitoring fluid level in a wellbore include computation, sonic echo meter, electromagnetic (EM) pulse device, and resistive wire methods.

A first method is that of computation. This involves continuously monitoring the output of a Permanent Downhole Gauge (PDG) and annulus pressure gauge and accounting for the gradient effect of the annular gas and the fluid column such that the fluid level in the wellbore can be continuously computed. This method is rarely used with conventional rod pumps due to high expense. This method is more adaptable for use with Electronic Submersible Pumps (ESPs) because the ESP cable can be shared with the gauge. Additionally, the gauge cost is justified to monitor the health of the ESP. ESPs, like other rotating pumps (such as PCPs), are usually run continuously and not shut in often.

A second known method is by the use of a permanently installed sonic echo meter. The meter measures the distance from the surface to the fluid level over time, as recorded through successive readings. Reading frequency is typically limited to one reading every 10 to 30 seconds. This method is limited in that it takes time for the sonic pulse effects to settle down, and the pulses are performed at a relatively low speed. Multiple readings may be needed for accuracy, creating a potential error, or missing changes in level that occur in short time periods.

A third known method is by resistive wire technique. This method also requires a special cable to be run into the wellbore fluid, and the properties of the resistive wire change when it is wet. Due to the special cable requirement and other disadvantageous, this method is rarely used on producing wells.

A fourth known method is by the use of a permanently installed electromagnetic (EM) pulse driven or frequency driven level meter connected to tubing or other isolated conductor in the annulus. This new method of measurement employs a technique known as Time Domain Reflectance (TDR). By this method, the fluid level can be continuously monitored through successive readings that are typically taken many times per second. The present invention is particularly well suited to this method due to the frequency and economy by which this method operates. The method is also advantageous because it does not require a dedicated electrically connective umbilical to be run the length of the wellbore.

Calculations

Figure 3:
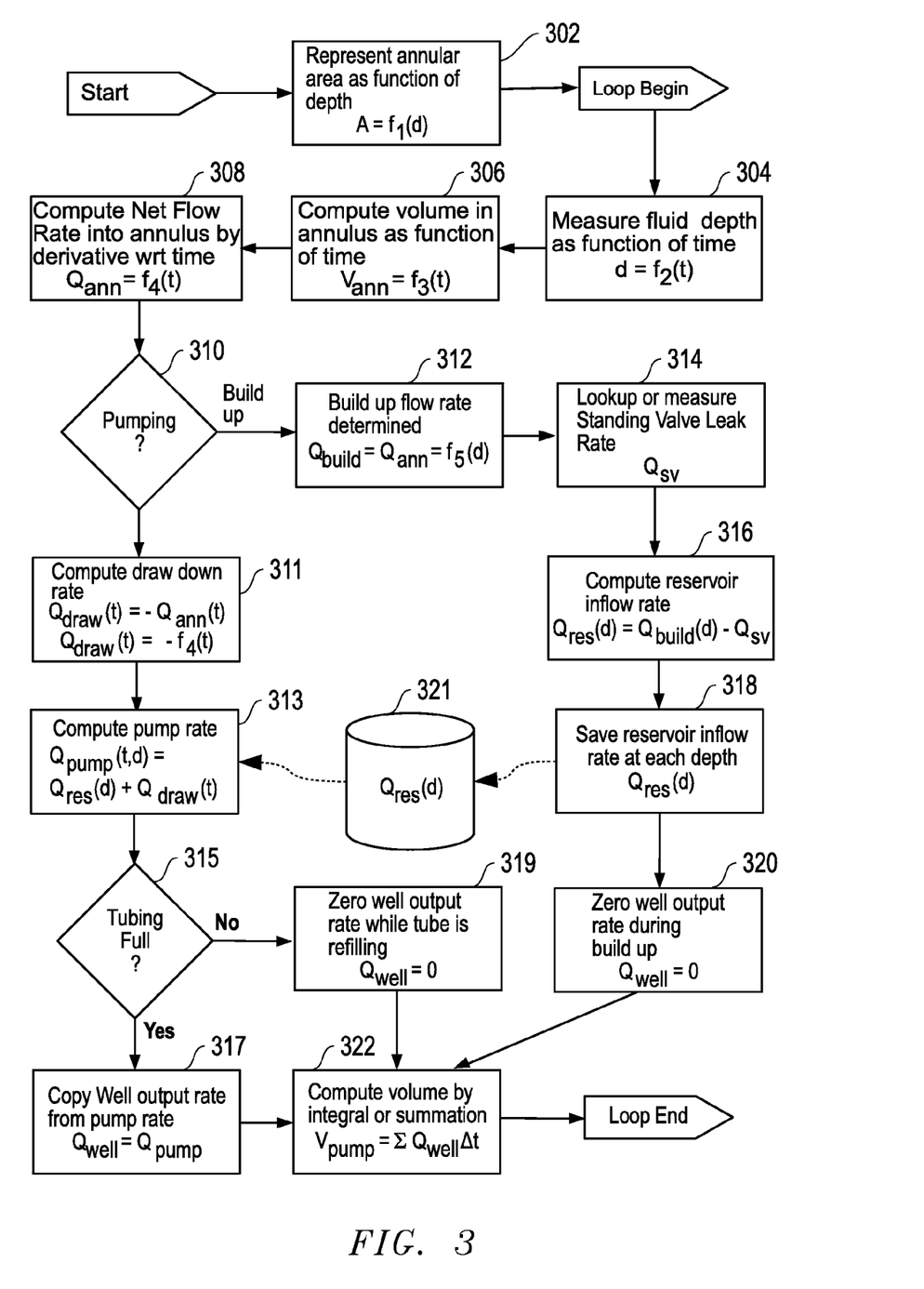
FIG. 3 is a flowchart illustrating the method steps and equations which comprise a representative embodiment of the present invention.

What follows is a description of the formulas related to the inventive method and implementation, which is illustrated in the flowchart shown in FIG. 3.

When a well completion is run, the wellbore geometry for the annular space is known as it is defined by the inner cylindrical surface of the casing program and the outer generally cylindrical surfaces of the production tubing and couplings and pump assembly. Once the completion is landed, a function of annular cross sectional area versus well depth is defined by these physical parameters. The resolution for this function is selectable. For example, one could define function as the average of the volumes over every foot, or over every 10 feet, or every 30 feet. In any event, a representative function must be used.

Therefore, as shown at 302, the annular area of the wellbore is a function of depth, based upon the geometry of the annular space referenced above. This is represented by EQ. 1:

$$A = f_1(d) \qquad \text{EQ. 1:}$$

The depth of fluid level is a function of time. For example, if the pump is pumping fluid out faster than it is being replaced, the depth of the fluid column is increasing. Fundamental to the present invention is the requirement to monitor the depth of the top of the fluid column, such as through Time Domain Reflectance (TDR) described above. This is represented at 304 by EQ. 2:

$$d = f_2(t) \qquad \text{EQ. 2:}$$

In this invention, the depth to the top of the fluid column is accurately and continuously measured, and the accuracy of this measurement is important to the system of determining the wellbore flow rate. The volume of fluid in the annulus is expressible as a function of time by combining EQ. 1 and EQ. 2 above, as shown at 306 in EQ. 3:

$$V_{ann} = f_3(t) \qquad \text{EQ. 3:}$$

The "Net Flow Rate" ($Q_{ann}$) into wellbore annulus is expressible as a function of time as the derivative of the above function $f_3$ with respect to time. This is shown at 308 in EQ. 4:

$$Q_{ann} = f_4(t) \qquad \text{EQ 4:}$$

$Q_{ann}$ can be continuously calculated by continuously monitoring fluid level and repeatedly computing the volume of fluid in the annulus ($V_{ann}$).

The present method requires a pump shut in event at 310 to measure the depth of the fluid level in the wellbore (between the casing and tubing). When the pump is turned off, fluid normally builds up in the wellbore. Since this method continuously and rapidly measures the depth of the fluid column, this change is measured as to the annulus. With respect to the domain of fluid depths observed during any pump shut in cycle, $Q_{ann}$ is determined and further designated as the Annular Build-up Flow Rate ($Q_{build}$) as a function of fluid depth. This is expressed at 312 in EQ. 5:

$$Q_{build} = Q_{ann} = f_5(d) \qquad \text{EQ. 5:}$$

It has been found that $Q_{build}$ will often be linear over a set range in which a rod pump well operates. However, this function may not be linear as a result, for example, of the variation in reservoir permeability, reservoir pressure, and perforation patterns or efficiencies at different depths.

If the well is shut in for a long time and fluid levels are allowed to rise significantly, the Annular Build Up Flow Rate ($Q_{build}$) will slow down significantly. So it can be seen that this function could be highly nonlinear in this case, and could possibly be an exponential function.

During every pump off cycle, $Q_{build}$ is recalculated over the domain of fluid depths observed and stored in memory, such as in storage on a computer, RAM or FLASH or other such device. The data from the most recent build-up test at each measured depth define an updated $Q_{build}$ as a function of depth ($f_5(d)$). This is the general case.

In one embodiment, when data is collected over the same domain of fluid depths at a different period in time, the data is instructive as in the normal operation of a rod pump over its operating range. Variations in the Annular Flow Rate results are used to expose changes in equipment performance. This use illustrates the need for a reliable measurement of the fluid level in the well to prevent incorrect deductions regarding the performance of the pumping equipment.

In another embodiment, when data is collected and $Q_{build}$ recalculated over the same domain of fluid depths at a different period in time, the algorithm would use an average over a defined previous number of cycles to improve accuracy of an updated $Q_{build}$ as a function of depth ($f_5(d)$), instead of simply using the most recent data collected.

In another embodiment in which data is collected and $Q_{build}$ recalculated over the same domain of depths at a different period in time, statistical criteria can be defined by which certain data is accepted and other data rejected as outside the defined statistical norms to improve the accuracy of an updated $Q_{build}$ as a function of depth ($f_5(d)$).

After initial pump start up, conventional practice is to leave the pump running and only shut it off when the fluid level in the well is fully pumped down (to the level of the pump). Then the pump would be turned off periodically for the wellbore to partially fill. The well would again be pumped down by timed pump operations. Such an approach would limit the method of the present invention to calculate meaningful rates based upon Annular Flow Rate (build-up) data during the initial, lengthy pump down phase. It can be seen that during pump down, stopping the pump following every so many feet of fluid drawn down for a sufficient time to establish the Annular Build-up Flow Rate ($Q_{build}$) at various depths would allow the function $Q_{build}=f_5(d)$ to be determined at those depths, again as shown at 312. The function can be further estimated through various interpolation or extrapolation methods for any particular fluid depth even though an actual build-up test may not have been run involving that particular fluid depth. In this manner, without much impact on the overall well production, developing an effective representation of the function ($f_5$) of Annular Build-up Flow Rate over the full domain of fluid depths of interest is achieved.

During pump shut off periods, the net flow rate into the annulus is referred to as the Annular Build-up Flow Rate ($Q_{build}$). $Q_{build}$ is the sum of the rate of flow into the wellbore from the reservoir termed, Reservoir Flow Rate ($Q_{res}$), and the rate of flow that escapes past the standing valve or check valve at the base or intake of the pump, defined herein as the Standing Valve Leak Rate ($Q_{sv}$) at 314 or alternatively the pump leak rate. This is expressed at 316 by EQ. 6 below:
During pump shut off periods:

$$Q_{ann}=Q_{build}=Q_{res}+Q_{sv} \qquad \text{EQ. 6:}$$

Recalling that the method of the present invention provides that $Q_{ann}$ (equals $Q_{build}$ when the pump is off) is known from the periodic measurement of the depth of fluid level from the most recent the shut in cycles, it only remains to determine a value for the Standing Valve Leak Rate ($Q_{sv}$) in order to solve EQ. 6 for the term $Q_{res}$. When a pump is first installed, $Q_{sv}$ is usually zero, and this can be verified by conventional methods that will be discussed further below. If the leak rate is zero, or otherwise known, or its assumed value is within an acceptable tolerance of actual, there is sufficient information to fully solve EQ. 6 for the term $Q_{res}$.

When the pump is operating, the net flow rate out of the annulus is referred to as the Annular Draw-down Flow Rate ($Q_{draw}$) because $Q_{ann}$ was previously defined to be at all times flow into the annulus $Q_{draw}=-Q_{ann}$, as shown at 311. The Annular Draw-down Flow Rate is the difference of the Reservoir Flow Rate ($Q_{res}$) and the Pump Flow Rate ($Q_{pump}$). This is expressed at 313 by EQ. 7 below:
When pump is operating:

$$-Q_{ann}=Q_{draw}=Q_{pump}-Q_{res} \qquad \text{EQ. 7:}$$

Recalling that the method of the present invention provides that $Q_{ann}$ is always known from the periodic measurement of the depth of the fluid level, it follows that $Q_{draw}$ is also always known during periods when the pump is running. It only remains to determine a value for the Pump Flow Rate ($Q_{pump}$) by solving EQ. 7. Since EQ. 6 was resolved with a determination of the Standing Valve Leak Rate ($Q_{sv}$), then the Reservoir Flow Rate ($Q_{res}$) is known. Applying this quantity to EQ. 7, EQ 7 may be solved for $Q_{pump}$, again shown at 313.

As shown, on determination of a value of $Q_{sv}$, optionally including an assumed value of $Q_{sv}$ within an acceptable tolerance of actual values, EQ. 6 and thus EQ. 7 can be solved to determine the two rate characteristics and functions.

Solving EQ. 6 provides Annular Wellbore Inflow from the reservoir ($Q_{res}$) as a function of depth at 318 as follows:

$$Q_{res}=f_6(d) \qquad \text{EQ. 8:}$$

$$Q_{res}(d)=Q_{build}(d)-Q_{sv} \qquad \text{EQ. 8a:}$$

$$Q_{res}(d)=f_5(d)-Q_{sv} \qquad \text{EQ. 8b:}$$

Solving EQ. 7 provides Pump Flow Rate ($Q_{pump}$) as a function of time during the pump operating period at 313 as follows:

$$Q_{pump}=f_7(t) \qquad \text{EQ. 9:}$$

$$Q_{pump}(t,d)=Q_{res}(d)+Q_{draw}(t) \qquad \text{EQ. 9a:}$$

$$Q_{pump}(t,d)=Q_{build}(d)-Q_{sv}+Q_{draw}(t) \qquad \text{EQ. 9b:}$$

$$Q_{pump}(t,d)=f_5(d)-Q_{sv}+Q_{draw}(t) \qquad \text{EQ. 9c:}$$

$$Q_{pump}(t)=f_5(f_2(t))-Q_{sv}+Q_{draw}(t) \qquad \text{EQ. 9d:}$$

EQ. 9-9d are only valid during pump operating periods. In one embodiment of this invention, during pump shut off periods, the pump flow rate ($Q_{pump}$) is considered to be negligible. The operating status of the pump is easily monitored and can be expressed as the Boolean function PumpOn(t) which is set to a value of 1 whenever the Pump is operating but is set to a value of 0 otherwise. Accordingly, EQ. 10 provides the pump flow rate ($Q_{pump}$) as a discontinuous function of time for all periods:

$$Q_{pump}(t) = \begin{cases} f_5(f_2(t)) - Q_{sv} + Q_{draw}(t) : \text{PumpOn} = 1 \\ 0 : \text{PumpOn} = 0 \end{cases} \qquad \text{EQ. 10}$$

EQ. 10 defines the instantaneous flow rate of the pump with respect to time. The total volume of fluid pumped through the well in any time period may be calculated by integrating the flow rate with respect to time, as shown at 322. EQ. 11 expresses the volume of fluid pumped as $V_{pump}$ during any period starting at time a and ending at time b.

$$V_{pump} = \int_a^b Q_{pump}(t)dt = \quad \text{EQ. 11}$$

$$\int_a^b \left( \begin{cases} f_5(f_2(t)) - Q_{sv} + Q_{draw}(t) : PumpOn = 1 \\ 0 : PumpOn = 0 \end{cases} \right) dt$$

The description of the present invention as provided here where instantaneous flow rates are calculated continuously and totalized fluid volumes are calculated by integration over time does not limit the invention to this sequence. For example, a practical alternative sequence for implementing the invention can also be accomplished by programming difference equations into computer software such that cumulative or totalized volumes are continuously calculated and wherein flow rates over any time period are calculated as a change in totalized volume divided by the length of the time period.

In one embodiment of the invention as shown at 317, the instantaneous flow rate from the well is estimated to be equal to the flow rate through the pump ($Q_{well} = Q_{pump}$), and the volume of fluid produced from the well over any given period is estimated to be equal to the volume produced through the pump ($V_{well} = V_{pump}$) over that same period.

In another embodiment of the invention, the flow rate from the well is considered to possibly differ from the flow rate through the pump and the volume of fluid produced from the well over any time period is considered to possibly differ from the volume produced through the pump over that same time period. In order to provide a more accurate determination of the flow rate from the well ($Q_{well}$), the fact that there can be no fluid flow from the well ($Q_{well} = 0$ as shown at 320) unless fluid is lifted sufficiently in the tubing to reach the surface wellhead outlet is taken into account. It is common for a check valve to be installed in the surface flow line very near the wellhead outlet. Fluid pumped from wellbore annulus into the well tubing that does not clear the flow line check valve does not contribute to $Q_{well}$ including such fluid volumes that subsequently leak back from well tubing into the wellbore annulus by virtue of a positive rate of leakage ($Q_{sv} > 0$) past the pump standing valve during pump shut off periods. Whenever the well is indeed flowing at the wellhead ($Q_{well} > 0$), the tubing must contain a full column of fluid and the pump must be effectively operating, such as at 315. During these periods, the flow rate for the well can be approximated to be the same rate as the flow rate through the pump. $Q_{well} = Q_{pump}$, as shown at 317. Conversely, at 319, $Q_{well}$ can be considered to be negligible 1) whenever the pump is operating but the tubing is not filled with fluid, or 2) whenever the pump is not operating. The function table below presents this relationship and how it is applied to more accurately define $Q_{well}$ with reference to whether or not the well is flowing.

$Q_{well}$ Function Table

| | Tubing not Full of Fluid | Tubing is Full of Fluid |
|---|---|---|
| PumpOn(t) = 1 or $Q_{pump} > 0$ | 0 | $Q_{pump}$ (Note: Well is Flowing) |
| PumpOn(t) = 0 or $Q_{pump} \leq 0$ | 0 | 0 |

The Boolean function PumpOn(t), which was described above, reflects the status of the pump and is set to a value of 1 whenever the pump is operating and to a value of 0 otherwise. The pump status may be obtained by various means but most easily through monitoring the pump controller's electrical relays but it may also be determined by monitoring whether the pump is providing a positive rate of flow ($Q_{pump} > 0$) as indicated by rising or falling fluid levels in the well bore annulus for example.

Determining whether the well is flowing may be accomplished through direct measurement means such as with the use of commercially available electric flow indicators attached to the wellhead or the well outlet flow line. Alternatively, methods may be employed to measure the presence of fluids in the tubing at the top of the well either directly by fluid contact with a probe or by measuring the distance to the top of the fluid column within the tubing using fluid level sensors. Level sensors based on time of signal flight methodologies utilizing either acoustic or electromagnetic signals may be used. The presence or absence of liquid within the tubing near the wellhead may be measured with any type of liquid sensitive on off sensor positioned at the wellhead tubing flange area on the wellbore side of the flow line check valve. Capacitance sensors, differential pressure sensors, or any viable liquid sensing devices can be used.

An alternative to directly detecting the presence of fluid or indication of fluid flow at the surface is to infer the occurrence of well flowing by keeping track of the volume of fluid pumped during pump on periods and the volume of fluid leaked through the pump or standing valve into the annulus during pump off periods. By accounting for the known dimensions of the of pump rods (if any) and tubing's inner diameter and starting from any known fluid level state, the depth of the fluid level in the tubing can be calculated over time and the well is inferred to be flowing whenever the fluid level in the tubing is calculated to be at or above the top of the well.

Thus, as shown in FIG. 3, the provided flowchart illustrates how this invention and the calculations presented above could be reduced to a computer algorithm.

In the method of the present invention described above, a determination was made of the Standing Leak Rate ($Q_{sv}$) as a means for solving EQ. 6. From this solution, the Pump Flow Rate ($Q_{pump}$) was calculated in EQ. 7. As an alternative to determining a Standing Leak Rate ($Q_{sv}$) value as a means for solving EQ. 6, an alternate method of calculating the Pump Flow Rate ($Q_{pump}$) can be incorporated. This allows for the preliminary solution of EQ. 7, and the subsequent solution of EQ. 6, to calculate the Standing Valve Leak Rate $Q_{sv}$.

For example, in the traditional rod pump methods based on pump displacement described as the fourth known method in the background of this disclosure, the known pump geometry is correlated with tracked data for the pump on times and pump stroke rates. From this information, a continuous or periodic comparison of the derived Pump Flow Rate ($Q_{pump}$) can be made with the measurement of the fluid level height disclosed herein and the pump rate from the pump displacement method. When the standard error is exceeded—it would be a flag that the system accuracy may be changing and to possibly take action to reevaluate the actual Standing Valve Leak Rate ($Q_{sv}$) through the means is most readily available.

Standing Valve Leak Rate Determination

A step in the method of the present invention is the assumption or determination of a Standing Valve Leak Rate ($Q_{sv}$). Determination of the Standing Valve Leak Rate ($Q_{sv}$) may be made by any one of the known methods. Examples of known methods for determining the Standing Valve Leak Rate include a pressurized pump-off method, or load cell/dynamometer techniques and related methods. In addition, a new method known as Time Domain Method (TDM) is disclosed below.

The first known method involves a pressurized pump-off. In this method, the well is pumped up against a closed production valve. The pump is stopped and observations are made of the flow line pressure upstream of the flow line valve. This method provides visibility of the leak, though it remains difficult to establish leak rate since the method requires accounting for the compressibility of the fluid with a high degree of precision. Also this method requires an unusual and cumbersome manual intervention.

The second known method is by use of surface mounted loads cell/dynamometer. This and other methods can involve stopping the pump on the down stroke and observing the rate of rod load increase to quantify standing valve leakage. Other known versions of the method do not require the pump to be stopped, but rather work by analyzing the dynamometer card during the down stroke to determine the rod velocity when the rod load begins to first increase, which relates to the leak rate of the standing valve. One such version of this method is disclosed in U.S. Pat. No. 7,212,923 to Gibbs et al. The disclosed technique relies on surface load and position measurements of the rod pumping unit, and thus makes a determination of the leak rate of a standing valve and traveling valve. In other known versions of this method in rod pump applications; there are alternative ways to use the load cell to observe the characteristics on the first several strokes until the tubing is filled.

Figure 4:
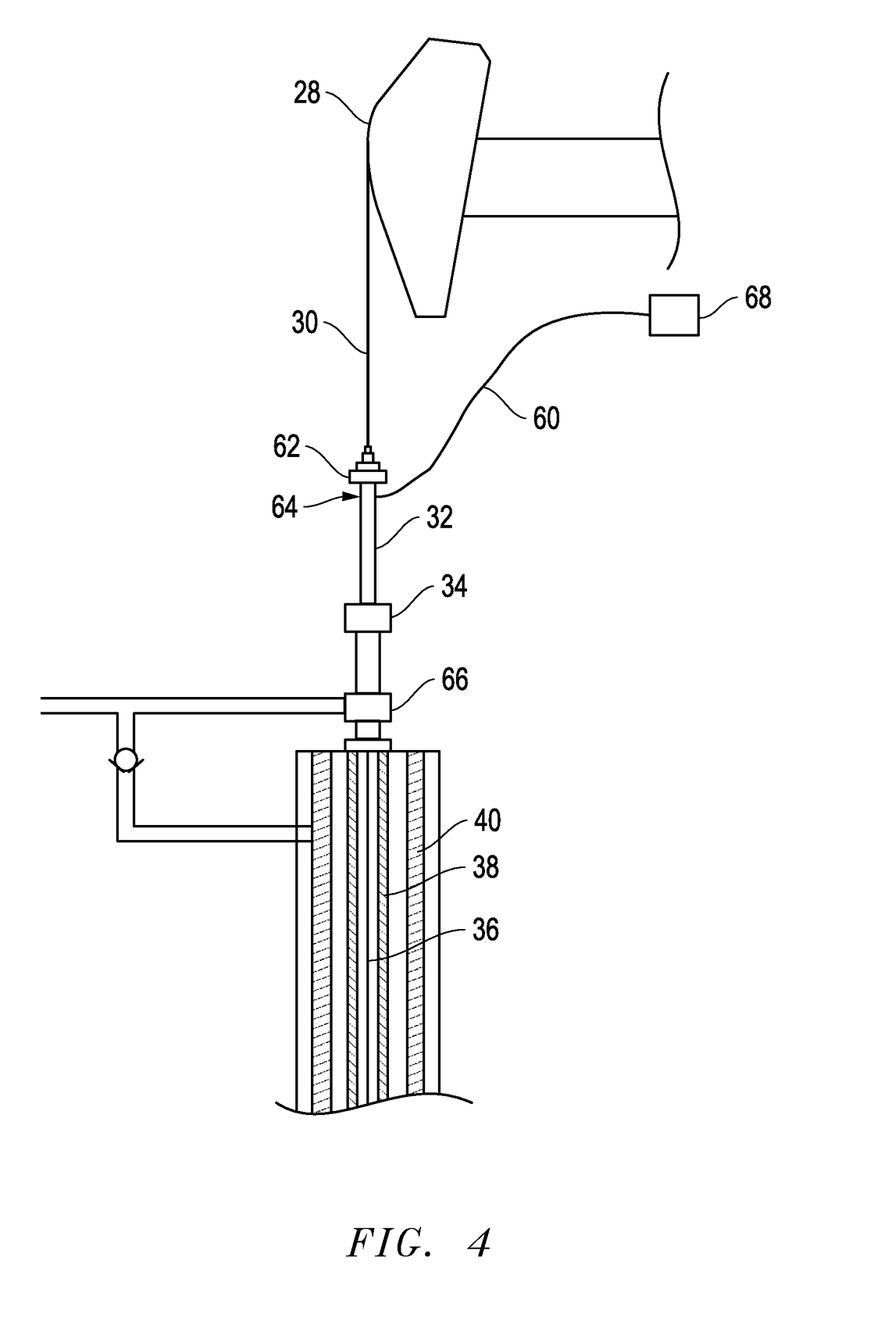
FIG. 4 is a side view diagram of a pumping unit having an arrangement supporting Time Domain Method (TDM) for determining the Standing Valve Leak Rate $Q_{sv}$.

An alternative method designated as Time Domain Method (TDM) for determining the Standing Valve Leak Rate $Q_{sv}$ is provided here. As described in WO 2011/044023 A2, it is possible to accurately and quickly measure the depth of the top of the producing fluid column using a pulse generator to generate a pulse of electromagnetic energy down a wellbore. A detector receives the reflected signal and, based on a known speed of signal propagation, the received signal is processed to determine the depth of the fluid surface. FIG. 4 is a side view diagram of an arrangement supporting Time Domain Method (TDM) by which the Standing Valve Leak Rate $Q_{sv}$, may be determined by use of methods of the present invention. In this view, a coaxial cable 60 is connected between the polished pump rod 32 and the pulse generator/receiver 68. A blocking ferrite ring 62 is provided to insulate the rod 32 from the pumping mechanism above. The tubing 38 is insulated from the rod 32, but it is only necessary to do this over the short distance that will be measured. As an example, this could be for a few rod lengths. An electromagnetic signal is initiated on the rod 32. The signal travels down the rod 32 via a signal injection point 64. The coaxial circuit is complete as being connected to the tubing 38 at the fluid surface interface. When the pump 44 is stopped, the fluid level in the tubing 38 decreases as a result of the standing valve leakage. The signals will be processed to measure the real time decline in the height of the fluid column within the tubing 38. Since the interior geometry of the tubing 38 and the exterior geometry of the rod 32 is known, the volume change per unit time is readily calculated to determine a measured Standing Valve Leak Rate $Q_{sv}$.

In the method of the present invention described above, a determination was independently made of the Standing Valve Leak Rate ($Q_{sv}$), which was subsequently used in solving EQ. 6. From this solution, the Pump Flow Rate ($Q_{pump}$) was calculated in EQ. 7. However, if an independent method of calculating the Pump Flow Rate ($Q_{pump}$) is available for use, a preliminary solution to EQ. 7 can be applied to yield a value for $Q_{res}$ which can be subsequently applied to EQ. 6 to solve for the Standing Valve Leak Rate $Q_{sv}$. An example of one such independent method of calculating the Pump Flow Rate is a traditional method based on pump displacement described as the fourth known method in the background of this disclosure wherein the known pump displacement geometry is correlated with tracked data for the pump on times and pump stroke rates. From this information, a continuous or periodic comparison between the Pump Flow Rate ($Q_{pump}$) derived from the pump displacement method can be made with the Pump Flow Rate ($Q_{pump}$) based upon the fluid level monitoring methods of the present invention. Trends in the comparison function can be analyzed. An increase or decrease in the comparison function over time is an indication that the system accuracy is possibly decreasing and the well operator can be flagged to evaluate the actual Standing Valve Leak Rate ($Q_{sv}$) or other parameter that might be causing pump inefficiency through appropriate means.

It will be readily apparent to those skilled in the art that the general principles defined herein may be applied to other embodiments and applications without departing from the spirit and scope of the present invention. Having thus described the exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments.

The invention claimed is:

1. A method for determining a fluid flow rate from a fluid producing subterranean wellbore where a pump is provided to remove fluid from the wellbore, comprising the steps of:
   providing a mechanism for measuring a depth of a top of a column of fluid in an annulus of a subterranean wellbore;
   determining an annular area of at least a fluid containing portion of the wellbore as a function of depth;
   measuring a depth of a fluid level in the annulus over time while the pump is not operating;
   calculating an annular build-up flow rate;
   determining a standing valve leak rate;
   calculating a reservoir flow rate;
   measuring the depth of the fluid level in the annulus over time while the pump is operating;
   calculating an annular drawn-down flow rate; and,
   calculating a pump flow rate.

2. The method of claim 1, the step of measuring the depth of the top of a column of fluid further comprising:
   sending an electrical signal from a surface of the wellbore along a conductor located in the wellbore; and,
   measuring a time to receive a reflecting signal at the surface of the wellbore.

3. The method of claim 1, the step of measuring the depth of the top of a column of fluid further comprising:
   sending a sonic signal at the surface of the wellbore along a conductor located in the wellbore; and,
   measuring a time to receive a reflecting signal at the surface of the wellbore.

4. The method of claim 1, the step of measuring the depth of the top of a column of fluid further comprising:
   providing a pressure measuring device inside the wellbore proximate to the pump and a communication device for providing a pressure reading from the pressure measuring device to a surface.

5. The method of claim 1, further comprising the steps of:
providing the measurements to a microprocessor; and,
performing the calculations on a microprocessor.

6. The method of claim 1, further comprising:
determining if fluid is flowing from the wellbore;
determining the well production rate to be equal to the pump flow rate if fluid is flowing from the wellbore; and,
determining the well production rate to be zero if fluid is not flowing from the wellbore.

7. The method of claim 6, the step of measuring the depth of the top of a column of fluid further comprising:
sending an electrical signal from a surface of the wellbore along a conductor located in the wellbore; and,
measuring a time to receive a reflecting signal at the surface of the wellbore.

8. The method of claim 6, the step of measuring the depth of the top of a column of fluid further comprising:
sending a sonic signal from a surface of the wellbore along a conductor located in the wellbore; and,
measuring a time to receive a reflecting signal at the surface of the wellbore.

9. The method of claim 6, the step of measuring the depth of the top of a column of fluid further comprising:
providing a pressure measuring device inside the wellbore proximate to the pump and a communication device for providing a pressure reading from the pressure measuring device to a surface.

10. A method for determining a volume of fluid produced at a surface during a given time interval from a fluid producing subterranean wellbore where a pump is provided to remove fluid from an annular section of the wellbore, comprising the steps of:
determining a well production rate according to the method of claim 1; and,
calculating the volume of fluid produced during the given time interval.

11. A method for determining a volume of fluid produced at a surface during a given time interval from a fluid producing subterranean wellbore where a pump is provided to remove fluid from an annular section of the wellbore, comprising the steps of:
determining the well production rate according to the method of claim 6; and,
calculating the fluid volume produced during the given time interval.

12. The method of claim 11, further comprising the steps of:
providing the measurements to a microprocessor; and,
performing the calculations on a microprocessor.

13. A method for determining a fluid flow rate from a fluid producing subterranean wellbore where a pump is provided to remove fluid from the wellbore, comprising the steps of:
providing a mechanism for measuring a depth of a top of a column of fluid in an annulus of a subterranean wellbore;
determining an annular area of at least the fluid containing portion of the wellbore as a function of depth;
measuring the depth of the top of the column of fluid in the annulus over time while the pump is not operating;
calculating an annular build-up flow rate over time as a function of the change in the depth of the top of the column of fluid while the pump is not operating and of the annular area;
providing a standing valve leak rate greater than or equal to zero;
calculating a reservoir flow rate as the difference between the annular build-up flow rate and standing valve leak rate;
measuring the depth of the top of the column of fluid in the annulus over time while the pump is operating;
calculating an annular drawn-down flow rate as a function of a change in the depth of the top of the column of fluid over time while the pump is operating and of the annular area; and,
calculating a pump rate as the sum of an annular drawn-down flow rate and a reservoir flow rate.

* * * * *